United States Patent [19]

Swentzel

[11] 4,325,168
[45] Apr. 20, 1982

[54] FILE FOR A CHAIN SAW

[76] Inventor: Kipling C. Swentzel, P.O. Box 58, West Milford, W. Va. 26451

[21] Appl. No.: 164,278

[22] Filed: Jun. 30, 1980

[51] Int. Cl.³ .................. B23D 71/00; B23D 63/00
[52] U.S. Cl. .................................... 29/78; 76/25 A
[58] Field of Search ..................... 29/78; 76/25 A

[56] References Cited

U.S. PATENT DOCUMENTS

| | | | |
|---|---|---|---|
| 295,487 | 3/1884 | Custer | 29/78 |
| 331,324 | 12/1885 | Piffard | 29/78 |
| 343,136 | 6/1886 | Moore | 29/78 |
| 1,746,391 | 2/1930 | Gibbs | 29/78 |
| 1,906,881 | 5/1933 | Olas | 29/78 |
| 2,956,333 | 10/1960 | Tubesing | 29/78 |
| 3,339,254 | 9/1967 | Anderson | 29/78 |

OTHER PUBLICATIONS

Catalog—Nicholson File Co.—Files and Rasps, 1948, Cover page and p. 50, XF Swiss Pattern Files.
Catalog—Nicholson File Co.—Files and Rasps—1956 Cover page and p. 18, Saw Files.
Catalog—Nicholson File Co.—1911, Cover page and p. 39, Increment Cut Files.

Primary Examiner—Harrison L. Hinson
Attorney, Agent, or Firm—John W. Huckert

[57] ABSTRACT

A hand file designed expressly for sharpening the cutting edge of a chisel tooth chain saw which cutting edge has substantially diagonal and horizontal beveled components. The file comprises an elongated flattened blade portion with rounded side edges, a finger hold at one end and a tang at the other, in which the filing surface area extends around both side edges of the elongated blade portion and ⅛ of an inch into the upper and lower flattened surface, and in length from the tang to the finger hold. The remainder of the flattened surface is smooth and provided with guide lines for angling the file with respect to the linear movement of the saw. The rounded edges are semi-circular and the thickness of the file is equal to the circumference of the semi-circle, and determines the fit between the depth gauge and the opposing cutting tooth on the variously sized chains, and the maneuverability into the beveled cutting edges of the saw tooth.

5 Claims, 5 Drawing Figures

U.S. Patent  Apr. 20, 1982  4,325,168

FILE FOR A CHAIN SAW

BACKGROUND OF THE INVENTION

1. Field of the Invention

A hand file designed to sharpen the cutting edge of chain saw teeth.

2. Description of the Prior Art

| Nicholson    | 58,025    | Sept. 11, 1866 | 29-78 |
| Custer       | 296,487   | March 18, 1884 | 29-78 |
| Piffard      | 331,324   | Dec. 1, 1885   | 29-78 |
| Anderson et al | 3,339,254 | Sept. 5, 1967 | 29-78 |

Nicholson discloses a round file of the type most commonly used to sharpen chain saws.

Custer discloses a long flat file, having filing portions along the side edges, a tang at one end and hand hold at the other. Piffard discloses a conventional file having a rounded finger holding end.

The Anderson et al file has been particularly designed for a chain saw in which the floor of the cutter link is flat. Anderson et al has modified the conventional circular file most commonly used on chain saw teeth by cutting off chord sections to produce flattened and smooth upper and lower surfaces with curved side filing edges. The depth of the chord cut determines the angle at which the filing edge section meets the saw tooth edge. The Anderson et al file is partitioned into sections with varying chord cuts so that it may be used with different sized chain saws. It does not have the versatility and maneuverability of the present device, in which all of the filing areas are applicable to all of the cutting teeth of the chain saws.

SUMMARY OF THE INVENTION

The present file has been designed for use with chain saws, particularly the chisel tooth chain saw. The teeth of these saws have compound beveled cutting edges and the leading cutting edges are angled with respect to the line of direction of the movement of the saw. The file must maintain that angling and at the same time keep the beveling even without thinning.

A round file cannot properly contact the beveled portion of the chisel tooth. It files only the outer edge leaving a thin wire cutting edge which will bend when it hits a knot in the wood.

Chain saws dull with use and require regular filing. Often this filing must be done on location in the field and by someone who is not skilled in the art. It is for such a situation that the present file was devised. It is small of the order of 11" long and less than an inch wide and can be carried in the pocket, it has guide lines to position the file parallel to the angle of the leading cutting edge of the tooth for the back and forth longitudinal filing strokes, and it is dimensioned so as to fit within the beveling of the cutting edges for routing strokes in a pivotal filing motion about one edge of the file as fulcrum.

The file is so dimensioned that one having a thickness 5/32 of an inch will work on all small and medium-size chains, and a file of 3/16 of an inch thick will sharpen all of the larger chain saws in the line. The use of the present device will allow longer periods of use for the saw before it needs another filing.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
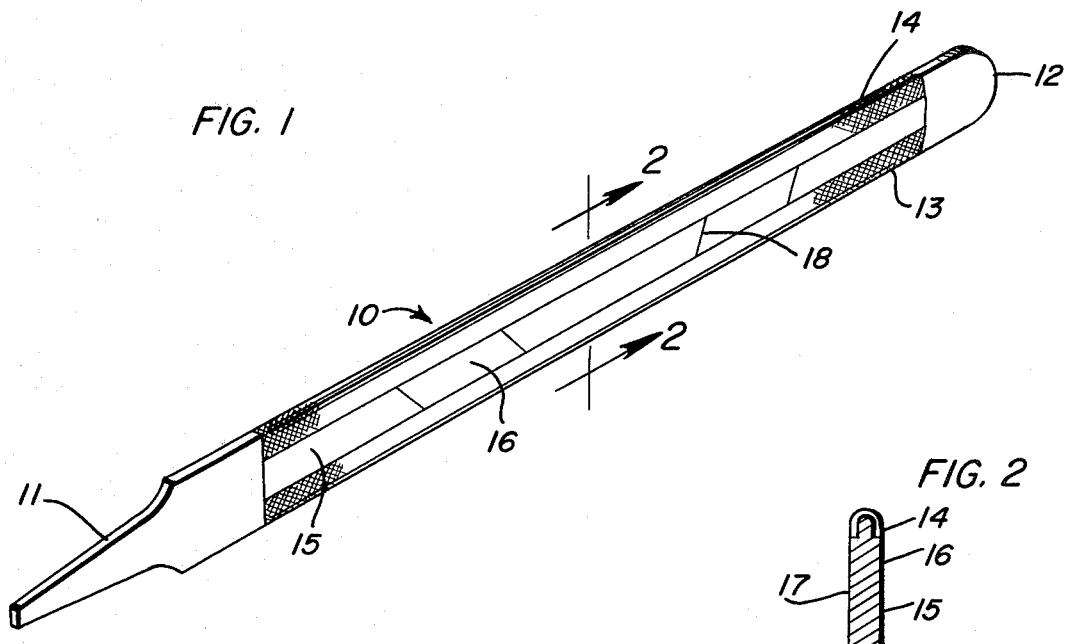
FIG. 1 is a perspective view of the file.
Figure 2:
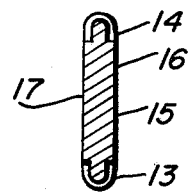
FIG. 2 is a cross-sectional view taken on line 2—2 of FIG. 1.

Referring more specifically to the drawings in FIG. 1, numeral 10 is used to designate the file. The file has a rounded finger hold 12 at one end, a conventional tang 11 at the other, and a smooth flat body portion 15 with upper and lower surfaces 16, 17 respectively. The longitudinal side edges of the flat body portion 15 are rounded as at 13 and 14 respectively. These areas are serrated to provide a filing surface which extends beyond the curvature for a distance of approximately $\frac{1}{8}$" into the flat of both surfaces 16 and 17 as seen in FIG. 5.

Figure 5:
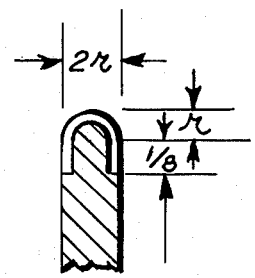
FIG. 5 is a broken enlarged section of FIG. 2.

It should be noted with respect to the enlarged section of FIG. 5 that the thickness of the file 10 is the diameter 2r of the semi-circular edges 13, 14, where r is the radius of the semi-circle and the circumference of the semi-circle is therefore $\pi r$. The filing surface at each longitudinal edge of the file is equal in circumference to $\pi r$ plus $2(\frac{1}{8})$ or $\pi r$ and $\frac{1}{4}$ inches. It has been noted that in the present device the thickness of the file determines its applicability to the size of chain saw, and through experimentation it has been found that a file of thickness 3/16" and more can service the larger chain saws, while a file of thickness 5/32" may be used with all small and medium-sized chain saws.

Figure 3:
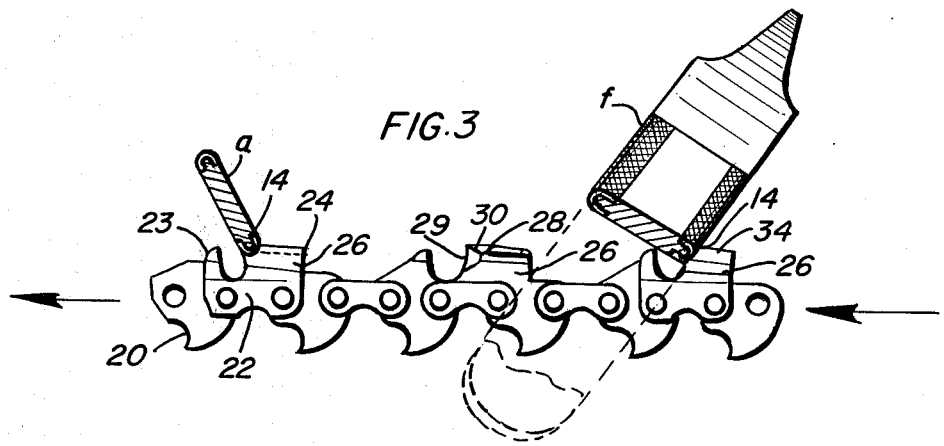
FIG. 3 is a view of the file as applied to different links in a section of the chain saw, the file being shown in cross section and partially in phantom where it overlies the chain.
Figure 4:
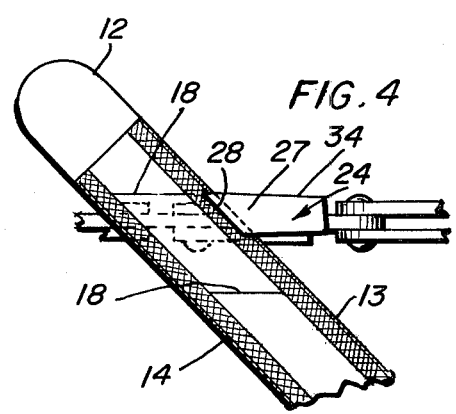
FIG. 4 is a top plan view of the file in use.

In FIG. 3 a section of the chain saw is illustrated which discloses a chisel tooth chain saw comprising driving links 20 connected to cutting links 22. Each cutting link 22 comprises a depth guage 23 preceding a tooth 24. Each tooth has a flat horizontal wall 27 (shown in FIG. 4) that is attached to a compoundly curved side wall 26, along a juncture 34. The plane of the horizontal wall 27 is normal to the line of movement of the saw as is indicated by arrows in FIG. 3. The leading edge 28 of wall 27 is the main cutting edge and is angled with respect to the line of movement and the juncture 34 as is shown in FIG. 4. Side wall 26 has a leading edge 29. The edges 28 and 29 are beveled and meet at an inside corner angle 30 as shown in FIG. 3. The cutter links are alternated at each side of the chain so that the inside angle 30 faces inwardly, then outwardly. In this way successive cutting links cut opposite sides of the kerf cut by the saw.

There are guide lines 18 on the file which serve to initiate the proper positioning for the longitudinal back and forth filing of edge 28. When guide lines 18 are aligned with the juncture 34 and the linear direction of movement of the saw, then the filing areas 13 and 14 are parallel to edge 28, as illustrated in FIG. 4. In order to reach into the beveled areas of edges 28 and 29, and into the inside angle 30, the file is rocked about its longitudinal edge to present more or less angle to the tooth as is shown in FIG. 3. In this figure the file 10 is held with filing surface 14 presenting less surface to the tooth as at a, and more surface as at b. Professional filing results are achieved by the use of this file, even when in the hands of the inexperienced workman.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A long flat file for use on a chisel tooth chain saw, said file having a smooth flat upper and lower surface, rounded longitudinal side edges serrated to provide a filing surface, the filing surface at each side edge extending beyond the curvature for a distance onto the flat upper and lower surfaces in an area parallel to the longitudinal axis of the file, the thickness of the file adapted to fit between the depth guage and cutting tooth of a chain saw for longitudinal filing of the leading edge of the cutting tooth, and for routing and filing of the beveled edges of the cutting tooth, by pivoting the file about one longitudinal edge, the rounded edges of the file being semi-circular, and the thickness of the file being equal to the diameter of the semi-circle.

2. A file as defined in claim 1 wherein the filing surface extends beyond the edge curvature for a distance of the order of $\frac{1}{8}''$ onto the flat upper and lower surfaces at both sides.

3. A file as defined in claim 1 wherein a rounded finger hold is provided at one end.

4. A file as defined in claim 3 wherein a tang is provided at the other end.

5. A file as defined in claim 1 wherein the flat smooth surface is provided with guide lines, which guide lines are at the same angle to the longitudinal axis of the file as the leading edge angle of the chisel tooth is to the direction of movement of the saw.

* * * * *